United States Patent
Novotny

(10) Patent No.: US 10,609,416 B2
(45) Date of Patent: *Mar. 31, 2020

(54) APPARATUSES AND METHODS FOR FILTERING NOISE FROM A VIDEO SIGNAL

(71) Applicant: Integrated Device Technology, Inc., San Jose, CA (US)

(72) Inventor: Pavel Novotny, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/032,469

(22) Filed: Jul. 11, 2018

(65) Prior Publication Data

US 2018/0332308 A1     Nov. 15, 2018

Related U.S. Application Data

(63) Continuation of application No. 14/495,583, filed on Sep. 24, 2014, now Pat. No. 10,027,986.

(51) Int. Cl.
| | |
|---|---|
| *H04N 19/80* | (2014.01) |
| *H04N 5/213* | (2006.01) |
| *H04N 19/176* | (2014.01) |
| *H04N 19/117* | (2014.01) |
| *H04N 19/136* | (2014.01) |
| *G06T 5/00* | (2006.01) |
| *H04N 5/21* | (2006.01) |

(52) U.S. Cl.
CPC .......... *H04N 19/80* (2014.11); *G06T 5/002* (2013.01); *H04N 5/21* (2013.01); *H04N 5/213* (2013.01); *H04N 19/117* (2014.11); *H04N 19/136* (2014.11); *H04N 19/176* (2014.11)

(58) Field of Classification Search
CPC combination set(s) only.
See application file for complete search history.

(56) References Cited

U.S. PATENT DOCUMENTS

| | | | |
|---|---|---|---|
| 5,844,627 A | 12/1998 | May et al. | |
| 6,005,626 A * | 12/1999 | Ding | H04N 19/51 348/608 |
| 6,657,676 B1 | 12/2003 | Borneo et al. | |
| 7,046,307 B1 * | 5/2006 | Hui | H04N 17/00 348/607 |
| 2007/0182862 A1 * | 8/2007 | Li | H04N 5/21 348/701 |
| 2007/0242288 A1 | 10/2007 | Fan | |
| 2008/0085060 A1 | 4/2008 | Bosco | 382/264 |
| 2009/0041373 A1 | 2/2009 | Incesu | 382/264 |

(Continued)

*Primary Examiner* — Md N Haque
(74) *Attorney, Agent, or Firm* — Christopher P. Maiorana, PC

(57) ABSTRACT

An apparatus includes a filter circuit and an encoder. The filter circuit may be configured to (i) calculate a noise level of a frame of a video signal based on a subset less than all of a plurality of blocks of the frame, where each of the blocks in the subset may have an associated weighted activity to variance ratio that exceeds a threshold value and (ii) generate a filtered video signal based on the noise level. An estimated noise level of each of the blocks in the subset may be selected from one of (a) an activity of the block, (b) another activity of a reference block of another frame and (c) a sum of absolute pixel differences between the block and the reference block. The encoder may be configured to generate a bitstream by encoding the filtered video signal.

16 Claims, 5 Drawing Sheets

(56) References Cited

U.S. PATENT DOCUMENTS

| | | | |
|---|---|---|---|
| 2009/0153739 A1* | 6/2009 | Hong | H04N 5/144 348/620 |
| 2010/0027905 A1 | 2/2010 | Zhang et al. | |
| 2010/0220939 A1 | 9/2010 | Tourapis et al. | |
| 2012/0030219 A1 | 2/2012 | Xu et al. | |
| 2012/0063694 A1 | 3/2012 | Segall | 382/235 |
| 2012/0081553 A1* | 4/2012 | Cote | H04N 9/045 348/207.1 |
| 2015/0379693 A1 | 12/2015 | Novotny et al. | |

* cited by examiner

ND METHODS FOR
APPARATUSES AND METHODS FOR FILTERING NOISE FROM A VIDEO SIGNAL

This application relates to U.S. Ser. No. 14/495,583, filed Sep. 24, 2014, which is incorporated by reference in its entirety.

FIELD OF THE INVENTION

Embodiments of this disclosure relate generally to video encoding, and examples of systems and methods for filtration of noise from a video signal are described.

BACKGROUND

Video or other media signals may be used by a variety of devices, including televisions, broadcast systems, mobile devices, and both laptop and desktop computers. Typically, devices may display video in response to receipt of video or other media signals, often after decoding the signal from an encoded form. Video signals provided between devices are often encoded using one or more of a variety of encoding and/or compression techniques, and video signals are typically encoded in a manner to be decoded in accordance with a particular standard, such as MPEG-2, MPEG-4, and H.264/MPEG-4 Part 10. By encoding video or other media signals, then decoding the received signals, the amount of data provided between devices may be significantly reduced. Often, in one or more steps of the video production process, random noise may be injected into the video signals, such as during recording or production of the or via transmission of the video signal.

Noise filters may be employed prior to encoding the video to remove the random noise. However, separating random noise from real content may be difficult, and imprecise and unreliable measurement capabilities of current noise filters make it challenging to avoid false noise detections in aggressive filtering, which can lead to under filtering or over filtering. Under filtering and/or over filtering may result in damage to the video content, such as content softening, filter switching artifacts, blending scenes together, and/or removing texture.

SUMMARY

The invention concerns an apparatus including a filter circuit and an encoder. The filter circuit may be configured to (i) calculate a noise level of a frame of a video signal based on a subset less than all of a plurality of blocks of the frame, where each of the blocks in the subset has an associated weighted activity to variance ratio that exceeds a threshold value and (ii) generate a filtered video signal based on the noise level. An estimated noise level of each of the blocks in the subset may be selected from one of (a) an activity of the block, (b) another activity of a reference block of another frame and (c) a sum of absolute pixel differences between the block and the reference block. The encoder may be configured to generate a bitstream by encoding the filtered video signal.

BRIEF DESCRIPTION OF THE FIGURES

Embodiments of the invention will be apparent from the following detailed description and the appended claims and drawings in which:

DETAILED DESCRIPTION OF THE EMBODIMENTS

Examples of apparatuses and methods for filtration of noise from a video signal are described herein. Certain details are set forth below to provide a sufficient understanding of embodiments of the disclosure. However, it will be clear to one having skill in the art that embodiments of the disclosure may be practiced without these particular details, or with additional or different details. Moreover, the particular embodiments of the present disclosure described herein are provided by way of example and should not be used to limit the scope of the disclosure to these particular embodiments. In other instances, well-known video components, encoder or decoder components, circuits, control signals, timing protocols, and software operations have not been shown in detail in order to avoid unnecessarily obscuring the disclosure.

Figure 1:
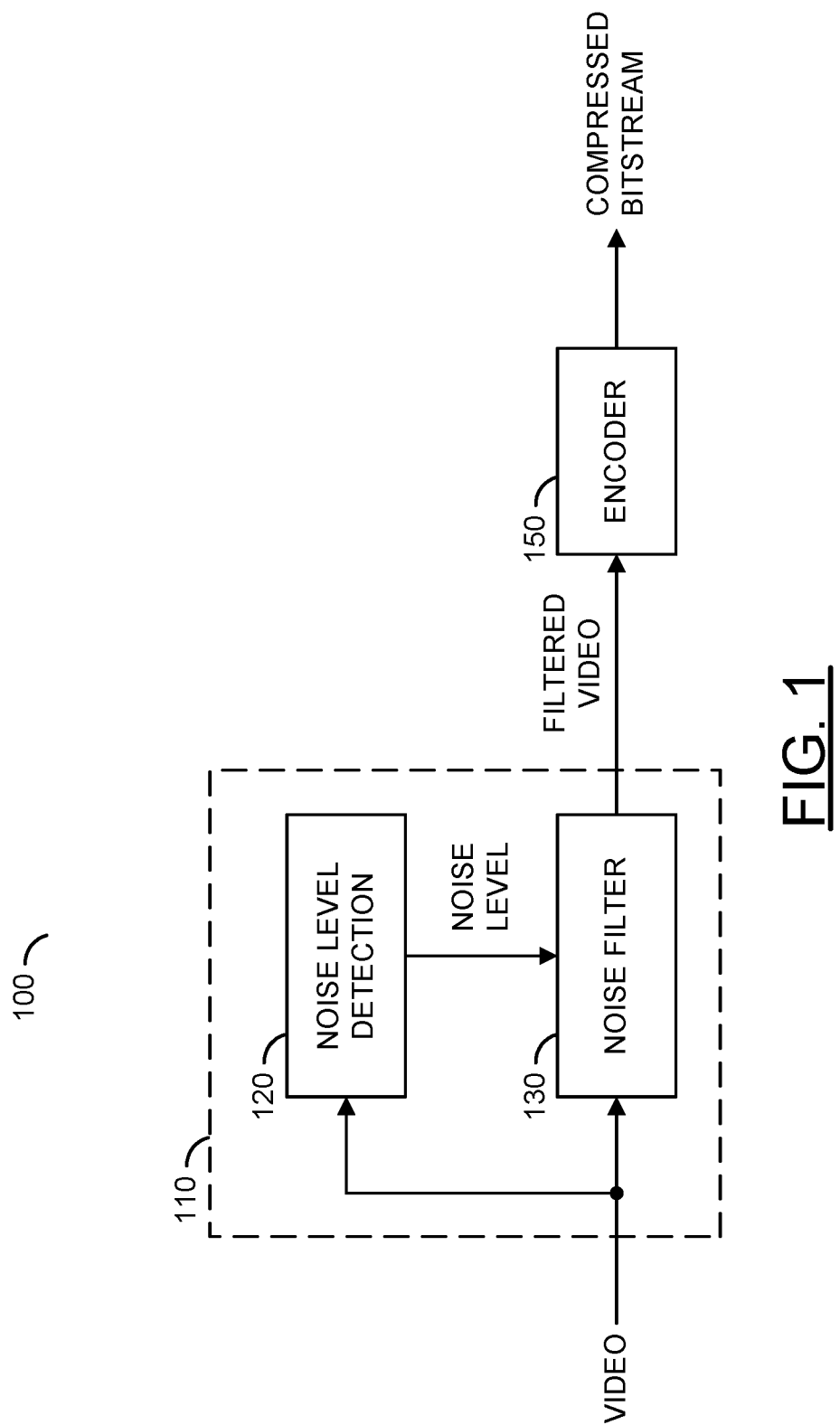
FIG. 1 is a block diagram of a noise filter system and an encoder according to an embodiment of the present disclosure.

FIG. 1 is a block diagram of an apparatus 100 including a noise filter system 110 and an encoder 150 according to an embodiment of the disclosure. The apparatus 100 may include one or more logic circuits, control logic, logic gates, processors, memory, and/or any combination or sub-combination of the same, and may be configured to filter noise from a video signal and to encode and/or compress a video signal using one or more encoding techniques. The noise filter system 110 may be configured to detect noise in the video signal, and filter the detected noise from the video signal. The encoder 150 may be configured to encode the filtered video signal to provide a compressed bitstream. The noise filter system 110 and/or the encoder 150 may be implemented in any of a variety of devices employing video encoding, including, but not limited to, televisions, broadcast systems, mobile devices, and both laptop and desktop computers.

The noise filter system 110 may include a noise level detection module 120 and a noise filter 130. The noise filter 130 may adaptively filter noise based on an estimated noise level provided by the noise level detection module 120. In some examples, the noise filter 130 may include a motion-compensated temporal filter (MCTF). The noise filter system 110 may provide a filtered video signal to the encoder 150.

The noise level detection module 120 may perform a noise detection process on the video signal. By way of example, a video signal may include a plurality of sequentially ordered coding units (e.g., block, macroblock, slice, frame, field, group of pictures, sequence). In a progressive video signal example, the noise level detection module 120 may apply the noise detection process between consecutive frames of the video signal. In an interlaced video signal example, the noise level detection module 120 may apply the noise detection process between consecutive fields, consecutive of the same parity, or a combination of both. Further, for interlaced video, the noise level detection module 120 may estimate a noise level for each video field separately, or for a field pair forming a frame. In the interest of clarity, the foregoing discussion will be based on estimation of a noise level by the noise level detection module 120 at a frame level, but the principles could be applied to different levels other than frame level noise estimations.

Within a frame, the noise level detection module 120 may estimate noise levels of individual macroblocks, and based on the estimated noise levels of individual macroblocks, estimate a noise level of the frame. It will be appreciated that the noise level detection module 120 may estimate noise levels at different block sizes than macroblocks. In some examples, the noise level detection module 120 may estimate noise levels based on luminance data, exclusively. In other examples, the noise level detection module 120 may estimate noise levels based on chrominance data or a combination of luminance and chrominance data.

During the process of estimation of the noise level of the frame, the noise level detection module 120 may eliminate saturated macroblocks (e.g., macroblocks that exceed a threshold luminance on either extreme). The noise levels of saturated macroblocks may be irrelevant to the noise level of the frame because the effect of the noise is masked by the saturation of the macroblock (e.g., noise within a macroblock with mostly black pixels or mostly white pixels being generally imperceptible).

The noise level detection module 120 may estimate a noise level for remaining macroblocks, determine noise in the residual of the remaining macroblocks, and mark macroblocks that have a certain level of noise in the residual as noisy. The estimated noise level, as well as determining which macroblocks have noise in residual, may be based on comparison with a reference macroblock of a previous frame. The noise detection process may further include evaluation of the noise level estimations for the noisy macroblocks to determine a noise level of the frame. The noise level of the frame may be used by the noise filter 130 to provide the filtered video signal.

In at least one embodiment, the encoder 150 may include an entropy encoder, such as a variable-length coding encoder (e.g., Huffman encoder or CAVLC encoder), and/or may be configured to encode data, for instance, at a macroblock level. Each macroblock may be encoded in intra-coded mode, inter-coded mode, bidirectionally, or in any combination or subcombination of the same. The video signal may be encoded in accordance with one or more encoding standards, such as MPEG-2, MPEG-4, H.263, H.264, H.265, and/or HEVC, to provide a coded bitstream. The coded bitstream may in turn be provided to a data bus and/or to a device, such as a decoder or transcoder (not shown in FIG. 1).

To encode each macroblock of a video signal, the encoder may utilize a standard mode decision process and identify a standard quantization parameter. The quantization parameter may, for instance, be provided from an external device and/or a user or may be generated by the encoder 150. The standard quantization parameter may be identified in accordance with any suitable encoding methodologies, including those directed to rate control and/or adaptive quantization.

In operation, the noise filter system 110 may receive the video signal from the source. The noise filter system 110 may detect and filter noise (e.g., random noise) from the video signal to provide a filtered video signal. The encoder 150 may receive the filtered video signal, and provide a compressed bitstream.

Responsive to receiving the video signal, the noise level detection module 120 may estimate a noise level of a frame of the video signal. The estimation of the noise level by the noise level detection module 120 may include identifying estimating a noise level of each non-saturated, noisy macroblock, and selecting a noise level of the frame based on the noise levels of the non-saturated, noisy macroblocks.

The noise level detection module 120 may identify saturated macroblocks of the frame, and eliminate the saturated macroblocks from the noise estimation. Determining saturated macroblocks may include determining minimum and maximum threshold pixel values for the frame. In one example, the minimum (e.g., black) and maximum (e.g., white) threshold pixel values may be determined by building a histogram of actual pixel values or average pixel values for each macroblock (e.g., macroblock DC values). A macroblock DC value may be determined as follows (e.g., assuming a 16×16 macroblock):

$$DC = (\Sigma_{y=0}^{15} \Sigma_{x=0}^{15} pixel_{x,y})/256$$

where $pixel_{x,y}$ is a pixel of the current macroblock. From the histogram, the minimum and maximum threshold pixel values may be determined based on a predetermined number of pixels falling outside a range defined by the minimum and maximum pixel values. For example, the minimum threshold pixel value may be set at a value where no more than 10 percent of the pixels values fall below the value, and the maximum threshold pixel value may be set to a value where no more than 10 percent exceed the value. Default limits may be set for the minimum and maximum threshold pixel values. For example, in 8-bit video signals, the minimum threshold pixel value may be limited to a value no less than 20 and the maximum threshold pixel value may be limited to a value no less than 244. Further, if a difference between the selected minimum and maximum threshold pixel values is less than a difference limit (e.g., less than 5), the minimum and maximum threshold pixel values may be reset to the default limits. In examples where the noise level detection module 120 is unable to obtain the minimum and maximum threshold pixel values for a frame, the minimum and maximum threshold pixel values from a previous frame may be used.

Using the minimum and maximum threshold pixel values, the noise level detection module 120 may determine which macroblocks are saturated. The noise level detection module 120 may mark a macroblock as saturated (and exclude the macroblock from the estimated noise level for the frame) when one of the macroblock DC value (e.g., average pixel value), the minimum pixel value, or the maximum pixel value falls outside of either of the minimum or maximum threshold pixel values. The saturated macroblocks may be excluded due to the saturated nature of the macroblocks (e.g., mostly black or mostly white) masking the effects of any noise present in a macroblock.

For the remaining macroblocks of a frame, the noise level detection module 120 may estimate a noise level for each. The estimated noise level for a macroblock may be based on a comparison between a closest matching macroblock (e.g., reference macroblock) for a previous frame. The estimated noise level may be based on one of a lowest of a sum of absolute pixel differences (SAD) between the current macroblock and the reference macroblock of a previous frame, the activity of the current macroblock, or the activity of the reference macroblock of the previous frame. The reference macroblock of the previous frame may be collocated with the current macroblock in the current frame or may be a motion compensated reference macroblock of the previous frame.

The SAD between the current macroblock and the reference macroblock may be calculated as follows:

$$SAD = \sum_{y=0}^{15} \sum_{x=0}^{15} |curr\_pixel_{x,y} - ref\_pixel_{x,y}|$$

where $curr\_pixel_{x,y}$ is a pixel of the current macroblock, and $ref\_pixel_{x,y}$ is a pixel of a reference macroblock. The SAD is an indication of a level of difference between the current and reference macroblocks. For macroblocks with a really good match in the reference frame the SAD value may be value low when no noise exists. Thus, the higher the SAD value, the higher magnitude of the noise in the current macroblock, assuming the noise is the dominating factor in the SAD value. The activity values for the current and reference macroblocks may be determined as a sum of absolute pixel differences in both the horizontal and vertical directions in the macroblock. The activity may be calculated as follows:

$$act = \sum_{y=0}^{15} \sum_{x=0}^{14} |pixel_{x,y} - pixel_{x+1,y}| + \sum_{y=0}^{14} \sum_{x=0}^{15} |pixel_{x,y} - pixel_{x,y+1}|$$

In this manner, act may be calculated by summing the absolute differences between neighboring pixels in an x direction for each row of a macroblock, and by adding to that a sum of the absolute differences between neighboring pixels in a y direction for each column of the macroblock. The activity values may indicate a spatial measure of differences in pixels of a macroblock. Typically, pixels within a macroblock may have similar values, and the activity value may be relatively low. Random noise in a video signal may result every pixel of a macroblock having a different value, which may increase the activity value. The noise level detection module 120 may compare the SAD value, the activity value for the current macroblock, and the activity value for the reference macroblock. Because the activity values have twice as much data as the SAD value, the activity values may be divided by two prior to the comparison. The estimated noise level for a macroblock may be selected from the lowest of the SAD value, the activity value of the current macroblock, or the activity value of the reference macroblock by the noise level detection module 120.

The noise level detection module 120 may then determine which macroblocks contain noise in the residual. The noise level detection module 120 may determine the residual of the current macroblock, which may be defined by a pixel difference between the current macroblock and a reference macroblock, and may be calculated as follows:

$$R_{x,y} = curr\_pixel_{x,y} - ref\_pixel_{x,y}$$

where $curr\_pixel_{x,y}$ is a pixel of the current macroblock, and $ref\_pixel_{x,y}$ is a pixel of a reference macroblock. Using the residual values, the noise level detection module 120 may determine a weighted activity/variance (actvar) ratio value for the macroblock. The actvar ratio value may distinguish between edges and regular textures of a macroblock, and random noise. The actvar value may include a variance (var) value based on the residual value. The var of the residual values may be determined as follows:

$$var = \sum_{y=0}^{15} \sum_{x=0}^{15} |R_{x,y} - DC|$$

where var represents the level of variance of a residuals of the macroblock pixels, x represents a horizontal pixel coordinate, and y represents a vertical pixel coordinate, and $R_{x,y}$ represents an intensity of a pixel residual at the location x,y. Accordingly, the variance of the macroblock represents a sum of the absolute differences between each pixel residual and the DC coefficient of the residual (e.g. average intensity of the macroblock residual). In this manner, a variance may be larger for macroblocks having a wide variation in residual intensity from an average, while the variance may be smaller for macroblocks having a small variation in residual intensity from the average macroblock intensity. Using the variance calculated for the macroblock residual and the activity calculated for the macroblock, the activity/variance (actvar) ratio may be calculated as follows:

$$actvar = 10 \times act/(var+1)$$

where actvar represents the activity/variance ratio, act is the activity of the macroblock, and var is the variance of the macroblock residual. In this example, the act is weighted by a multiplier of 10. Different weighting values may be used in other examples. Alternatively, actvar may be determined in accordance with the following equation when the activity (act) is less than 256 (e.g., assuming a 16/16 macroblock):

$$actvar = (13 \times (256 - act) + act \times actvar' + 128)/256$$

where actvar represents the weighted activity/variance ratio, act is the activity of the macroblock, and actvar' is the previously defined actvar equation. As previously described, the actvar ratio value may distinguish between edges and regular textures of a macroblock, and random noise. In some examples, the higher the actvar ratio, the more random noise included in the macroblock. For example, when the macroblock includes an edge (e.g., and no or little random noise), the activity may be low (e.g., pixel differences are small), while the variance of the macroblock may be high due to the edge differences, resulting in a smaller value of the actvar ratio. Further, when the same macroblock with an edge also includes random noise, the act may be high due to differences on many pixels (and further amplified/weighted by the ×10 multiplier), while the var may remain the same, which may result in a large increase in the actvar ratio over the previous example without noise.

The noise level detection module 120 may use the actvar ratio to determine whether a macroblock should be designated (e.g., marked) as noisy. In some examples, only macroblocks 'marked' as noisy are included in the noise estimation for the frame. For example, when the actvar ratio exceeds a threshold value, such as 20, the macroblock may be 'marked' as noisy.

In some examples, the noise level detection module 120 may use a combination of the estimated noise level for the macroblock and the actvar ratio to designate the macroblock as noisy (e.g., the actvar ratio exceeds a value and the estimated macroblock noise is less than a threshold noise value). In some examples, a test video signal is provided to an encoder to test extreme video content verify whether the encoder is equipped to handle the extreme video content in order to meet a defined standard. Thus, the threshold noise value may be used to prevent these test frames/macroblocks from being detected as noise and altered.

Further, if data from a next consecutive frame is available, the current macroblock may be designated as 'noisy' based on data from the next frame. For example, if a collocated macroblock of the next frame has an actvar ratio that exceeds a next-frame threshold value (e.g., 16) and an estimated noise value that is less than a next-frame noise threshold value (e.g., 1200). The collocated macroblock estimated noise level may be determined by dividing the act of the collocated macroblock by three. The current macroblock may be designated as noisy based on the collocated macroblock because the collocated macroblock likely having noise likely means the current macroblock has noise, and the noise may increase as it propagates from frame to frame.

The noise level detection module 120 may use the estimated noise for all non-saturated macroblocks that are marked as 'noisy' to build a statistical model for determining an estimated noise level for the frame. For example, the noise level detection module 120 may build a histogram for all noisy macroblocks. The size of the histogram may be based on the implementation. In one example, the histogram may have 256 bins and a precision of ¼ of a macroblock.

The noise level detection module 120 may process the histogram to determine an estimated noise level for the frame. The noise level detection module 120 may smooth out random variation and bumps in the histogram by applying a low pass filter to the histogram. In one example, the low pass filter may be a 5-tab low pass filter with all coefficients equal. After being filtered, the noise level detection module 120 may identify a peak within the histogram, and may select the estimated noise level associated with the peak for the frame. If the histogram includes more than one peak of similar amplitude after filtering, the peaks may be weighted right, with the right-most peak being selected.

To prevent over-filtering, the noise level detection module 120 may perform a sensitivity check. For example, the noise level detection module 120 may determine a sensitivity noise level at which a defined percentage (e.g., 50%) of macroblocks fall below. The noise level detection module 120 may select the lower of the sensitivity noise level and the selected peak noise level as the frame level noise level.

The noise level detection module 120 may evaluate the selected peak to determine whether the selected peak has enough samples to be considered useful. Thus, the noise level detection module 120 may compare the number of samples at the peak with a video resolution adaptive threshold, and if the number of samples falls below the threshold, the noise level of the frame may be scaled down towards zero using bi-linear interpolation based on the number of samples within the peak to determine the selected noise level.

The noise level detection module 120 may provide the selected noise level to the noise filter 130, and the noise filter 130 may filter the frame using the selected noise level. In some examples, the noise levels between frames may remain relatively consistent. Thus, when the noise levels remain relatively consistent, the noise filter 130 may apply a low-pass infinite-impulse response (IIR) filter between consecutive frames to maintain consistency between consecutive frames.

The encoder 150 may operate in accordance with one or more video coding standards, such as H.264, which employ motion prediction and/or compensation. The encoder 150 may further include a feedback loop that mirrors elements included in a decoder. The feedback loop may reverse, at least in part, the encoding process performed by the encoder 150.

Figure 2:
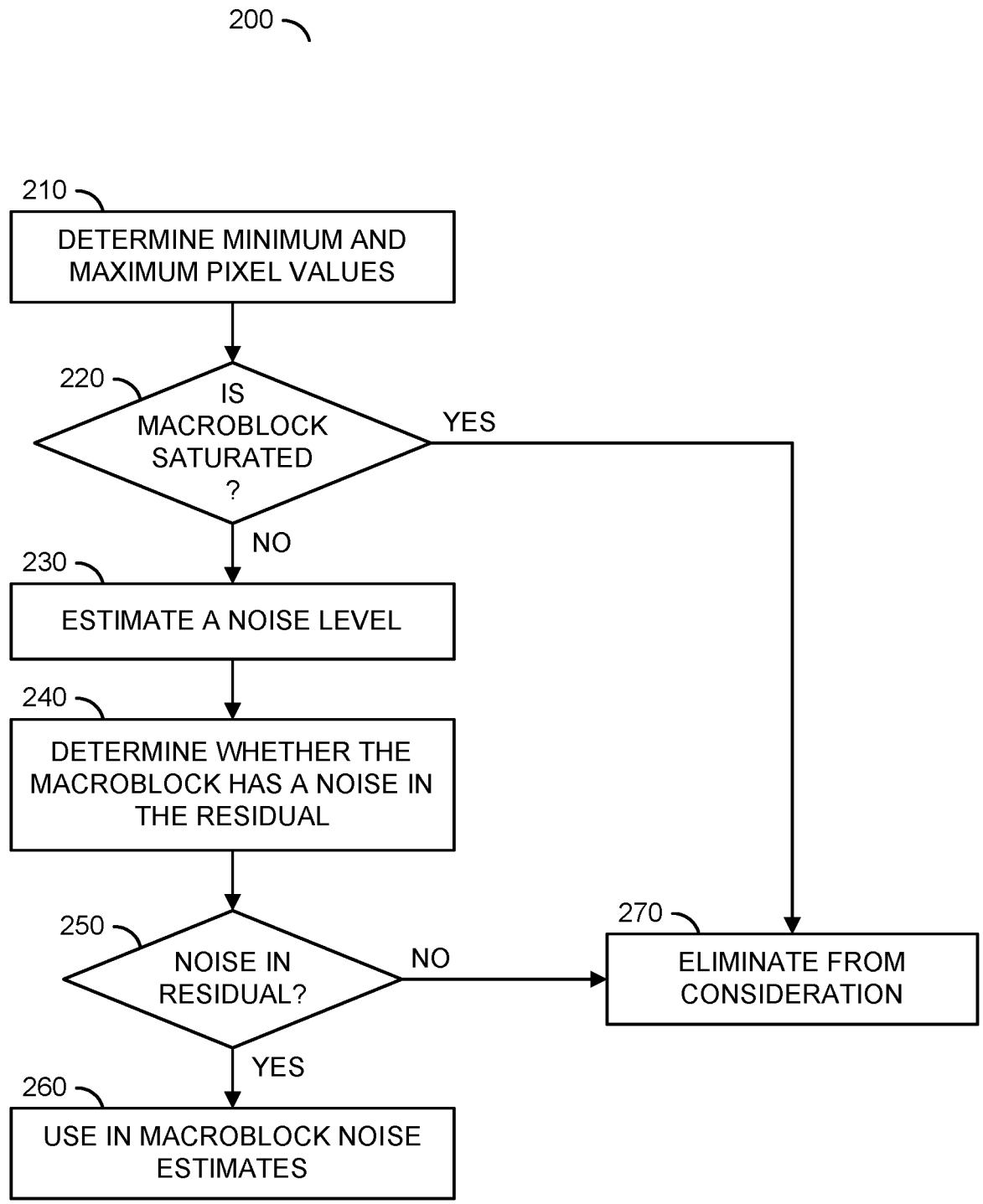
FIG. 2 is a flowchart of a method for determining which macroblocks are included in determining a noise level for the frame according to an embodiment of the present disclosure.

FIG. 2 is a flowchart of a method 200 for determining which macroblocks are included in determining a noise level for the frame according to an embodiment of the disclosure. The method 200 may be implemented using the noise filter system 110 of FIG. 1.

The method 200 may include determining minimum, maximum, and/or average pixel values of a macroblock of a frame, at 210. The method 200 may further include determining whether the macroblock is saturated, at 220. Determining whether the macroblock is saturated may be based on whether one of the minimum pixel value falls below a minimum threshold value, the maximum pixel value exceeds a maximum threshold value, and/or whether one of the average pixel value falls outside a range defined by the minimum threshold value and the maximum threshold value. The minimum and maximum threshold values may be determined based on a histogram of pixel values across the frame. If the macroblock is saturated, the method 200 may include eliminating the macroblock from consideration, at 270.

If the macroblock is not saturated, the method 200 may include estimating a noise level for the macroblock, at 230. Estimating the noise level for the macroblock may include a minimum of the SAD between the current macroblock and a reference macroblock of a previous frame, the activity of the current macroblock, or the activity of the reference macroblock of the previous frame. The method 200 may further include determining whether the macroblock has noise in the residual, at 250. Determining whether the macroblock has noise in the residual may include determining whether a weighted activity to variance ratio for the macroblock exceeds a threshold value. The method 200 may include determining the activity value for the macroblock based on a sum of absolute pixel intensity differences and determining the variance value of the macroblocks based on a sum of absolute differences in pixel intensity and an average pixel intensity of the macroblock. The weighted activity to variance ratio may include multiplying the activity by a multiplier to weight the activity. Determining whether the macroblock has noise in the residual may further include determining whether the estimated noise level exceeds a maximum noise threshold. In an example, if the weighted activity to variance ratio exceeds a threshold value, and the estimated noise for the macroblock is below a maximum noise threshold, the method 200 may include using the macroblock to determine the noise level of the frame, at 260. Otherwise, the macroblock may be eliminated from consideration, at 270.

In an example, the method may include using the macroblock to determine the noise level of the frame, at 260, when the weighted activity to variance ratio is below the threshold if the activity to noise ratio of a collocated macroblock of a next frame is above a second threshold and an estimated noise level of the collocated macroblock is above a second maximum noise threshold. The estimated noise level of the collocated macroblock may be the activity of the pixels of the reference macroblock divided by three. Using a macroblock that has been otherwise determined to lack noise in the residual based on a collocated macroblock of a next frame may serve to smooth a transition between frames when a next frame is determined to contain noise, as noise is likely to increase from frame to frame.

Figure 3:
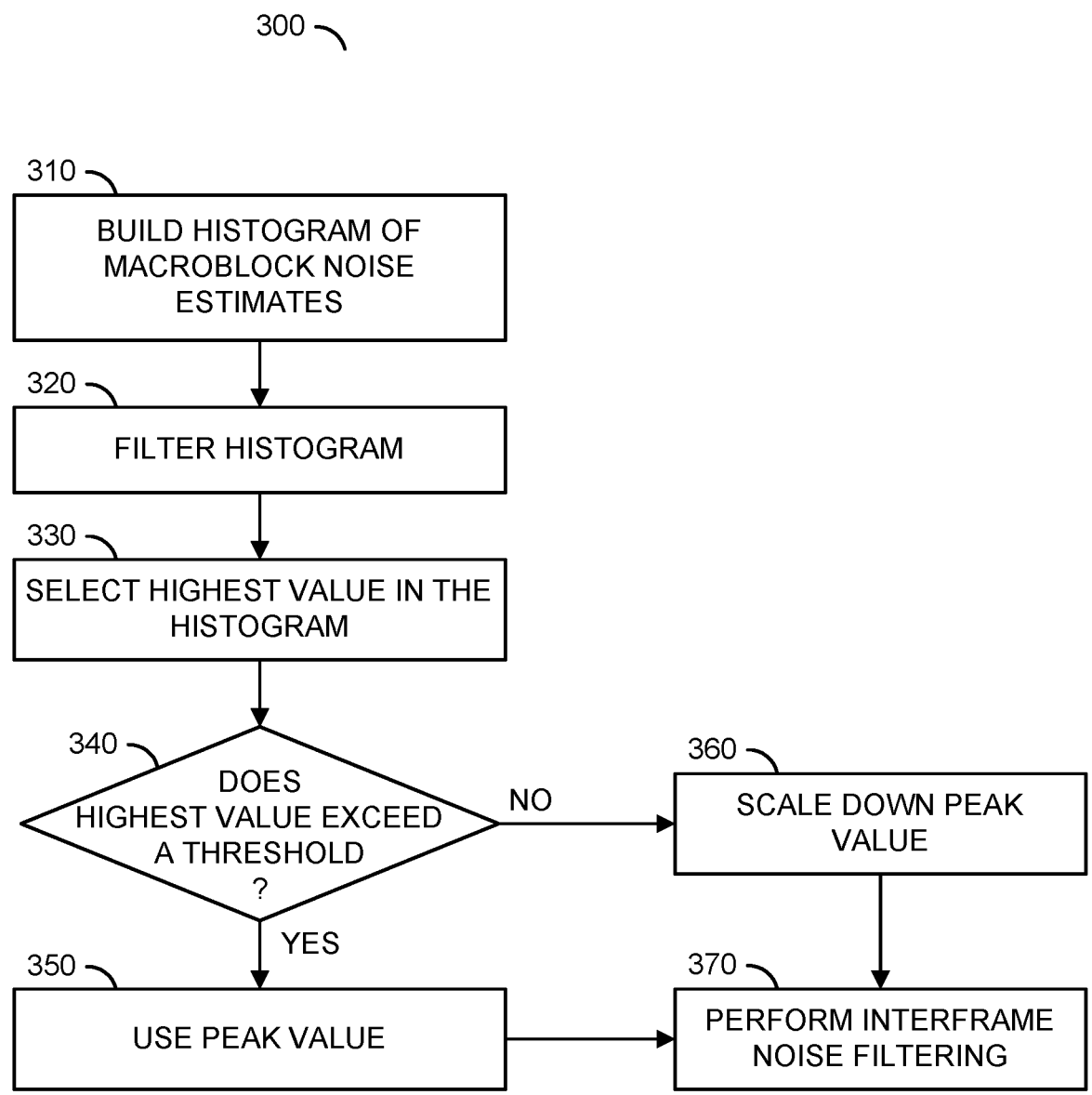
FIG. 3 is a flowchart of a method for determining a noise level for the frame according to an embodiment of the present disclosure.

FIG. 3 is a flowchart of a method 300 for determining a noise level for the frame according to an embodiment of the disclosure. The method 300 may be implemented using the noise filter system 110 of FIG. 1.

The method 300 may include building a histogram of macroblock noise estimates, at 310. The histogram of macroblock noise estimates may include noise estimates of each of the macroblocks selected using the method 200 of FIG. 2. The method 300 may further include filtering the histogram, at 320. Filtering the histogram may be via a low pass filter to smooth random variations and bumps. For example, the low pass filter may be a 5-tap low pass filter with all coefficients equal to one another.

The method 300 may further include selecting a highest/peak value of the histogram as the noise level of the frame, at 330. If the histogram includes more than one peak of similar amplitude after filtering, the method 300 may include weighting the peaks to the right, and selecting the right-most peak.

The method 300 may further include determining whether the highest/peak value exceeds a sensitivity threshold, at 340. The sensitivity threshold may be defined as a noise level at which a defined percentage (e.g., 50%) of macroblocks fall below. If the highest/peak value is greater than the sensitivity threshold, the method 300 may include using the sensitivity threshold of the frame, at 360. Otherwise, the method 300 may further include using highest value for the noise level of the frame, at 350.

The method 300 may further include evaluating the selected peak to determine whether the peak has enough samples to be considered useful. For examples, the method 300 may include comparing a number of samples at the peak with a video resolution adaptive threshold, and if the number of samples falls below the video resolution adaptive threshold, scaling down (e.g., reducing) the noise level for the frame towards zero using bi-linear interpolation based on the number of samples.

The method 300 may further include filtering the frame based on the noise level of the frame, at 370. In some examples, the noise level of the frame may have a low-pass infinite-impulse response (IIR) filter applied between consecutive frames to maintain consistency between consecutive frames.

The method 200 and/or the method 300 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 200 and/or the method 300 may be implemented by a computing system using, for example, one or more processing units that may execute instructions for performing the method that may be encoded on a computer readable medium. The processing units may be implemented using, e.g. processors or other circuitry capable of processing (e.g. one or more controllers or other circuitry). The computer readable medium may be transitory or non-transitory and may be implemented, for example, using any suitable electronic memory, including but not limited to, system memory, flash memory, solid state drives, hard disk drives, etc. One or more processing units and computer readable mediums encoding executable instructions may be used to implement all or portions of noise filter systems, encoders, and/or encoding systems described herein.

Figure 4:
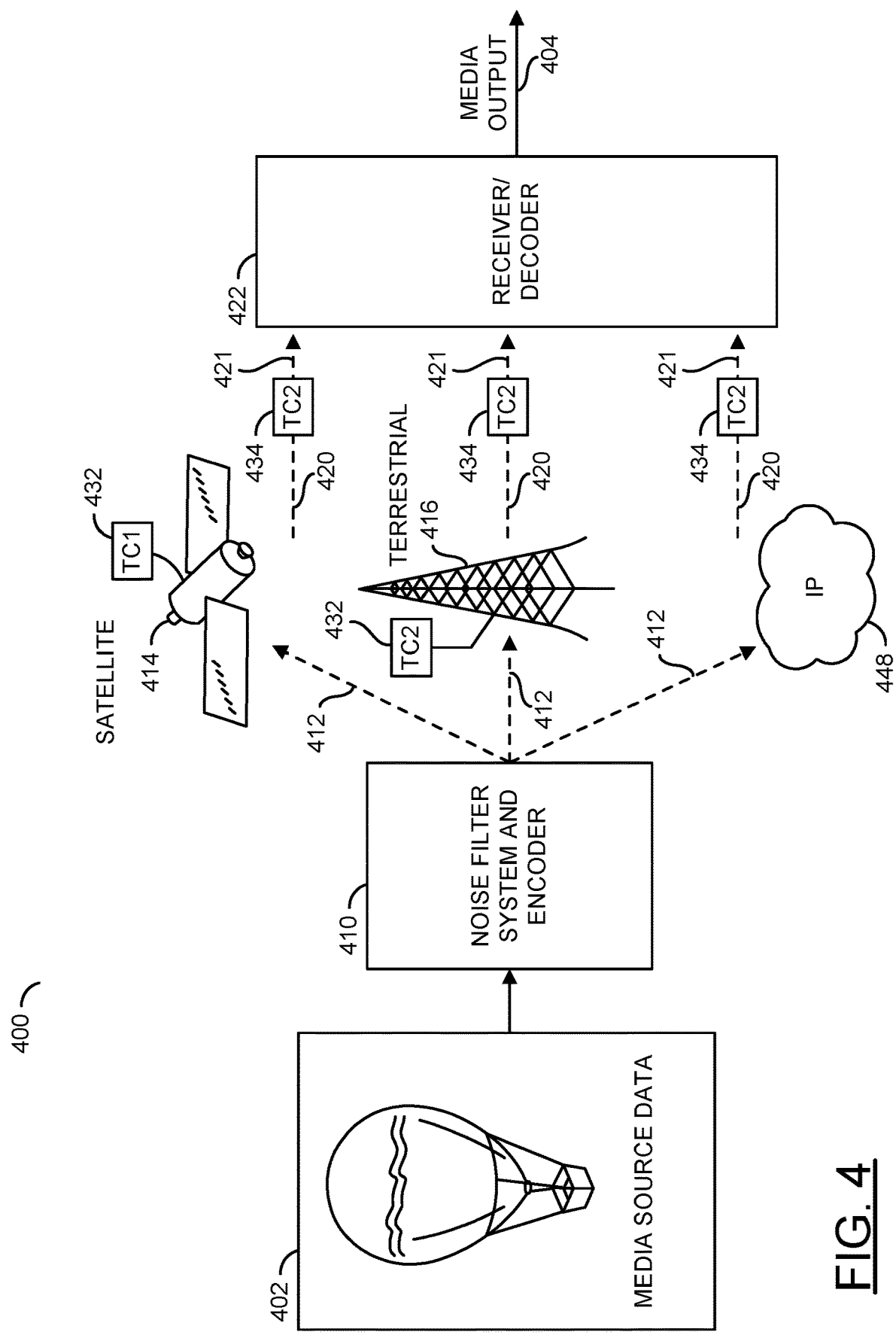
FIG. 4 is a schematic illustration of a media delivery system according to an embodiment of the disclosure.

FIG. 4 is a schematic illustration of a media delivery system 400 in accordance with embodiments of the present disclosure. The media delivery system 400 may provide a mechanism for delivering a media source 402 to one or more of a variety of media output(s) 404. Although only one media source 402 and media output 404 are illustrated in FIG. 4, it is to be understood that any number may be used, and examples of the present disclosure may be used to broadcast and/or otherwise deliver media content to any number of media outputs.

The media source data 402 may be any source of media content, including but not limited to, video, audio, data, or combinations thereof. The media source data 402 may be, for example, audio and/or video data that may be captured using a camera, microphone, and/or other capturing devices, or may be generated or provided by a processing device. Media source data 402 may be analog or digital. When the media source data 402 is analog data, the media source data 402 may be converted to digital data using, for example, an analog-to-digital converter (ADC). Typically, to transmit the media source data 402, some type of compression and/or encryption may be desirable. Accordingly, a noise filter system and noise filter system and encoder 410 may be provided that may encode the media source data 402 using any encoding method in the art, known now or in the future, including encoding methods in accordance with video standards such as, but not limited to, MPEG-2, MPEG-4, H.264, H.HEVC, or combinations of these or other encoding standards. The noise filter system and encoder 410 may be implemented using any encoder described herein, including the apparatus 100 of FIG. 1, and may perform the method 200 of FIG. 2 and/or the method 300 of FIG. 3.

The encoded data 412 may be provided to a communications link, such as a satellite 414, an antenna 416, and/or a network 448. The network 448 may be wired or wireless, and further may communicate using electrical and/or optical transmission. The antenna 416 may be a terrestrial antenna, and may, for example, receive and transmit conventional AM and FM signals, satellite signals, or other signals known in the art. The communications link may broadcast the encoded data 412, and in some examples may alter the encoded data 412 and broadcast the altered encoded data 412 (e.g. by re-encoding, adding to, or subtracting from the encoded data 412). The encoded data 420 provided from the communications link may be received by a receiver 422 that may include or be coupled to a decoder. The decoder may decode the encoded data 420 to provide one or more media outputs, with the media output 404 shown in FIG. 4.

The receiver 422 may be included in or in communication with any number of devices, including but not limited to a modem, router, server, set-top box, laptop, desktop, computer, tablet, mobile phone, etc.

The media delivery system 400 of FIG. 4 and/or the noise filter system and encoder 410 may be utilized in a variety of segments of a content distribution industry.

Figure 5:
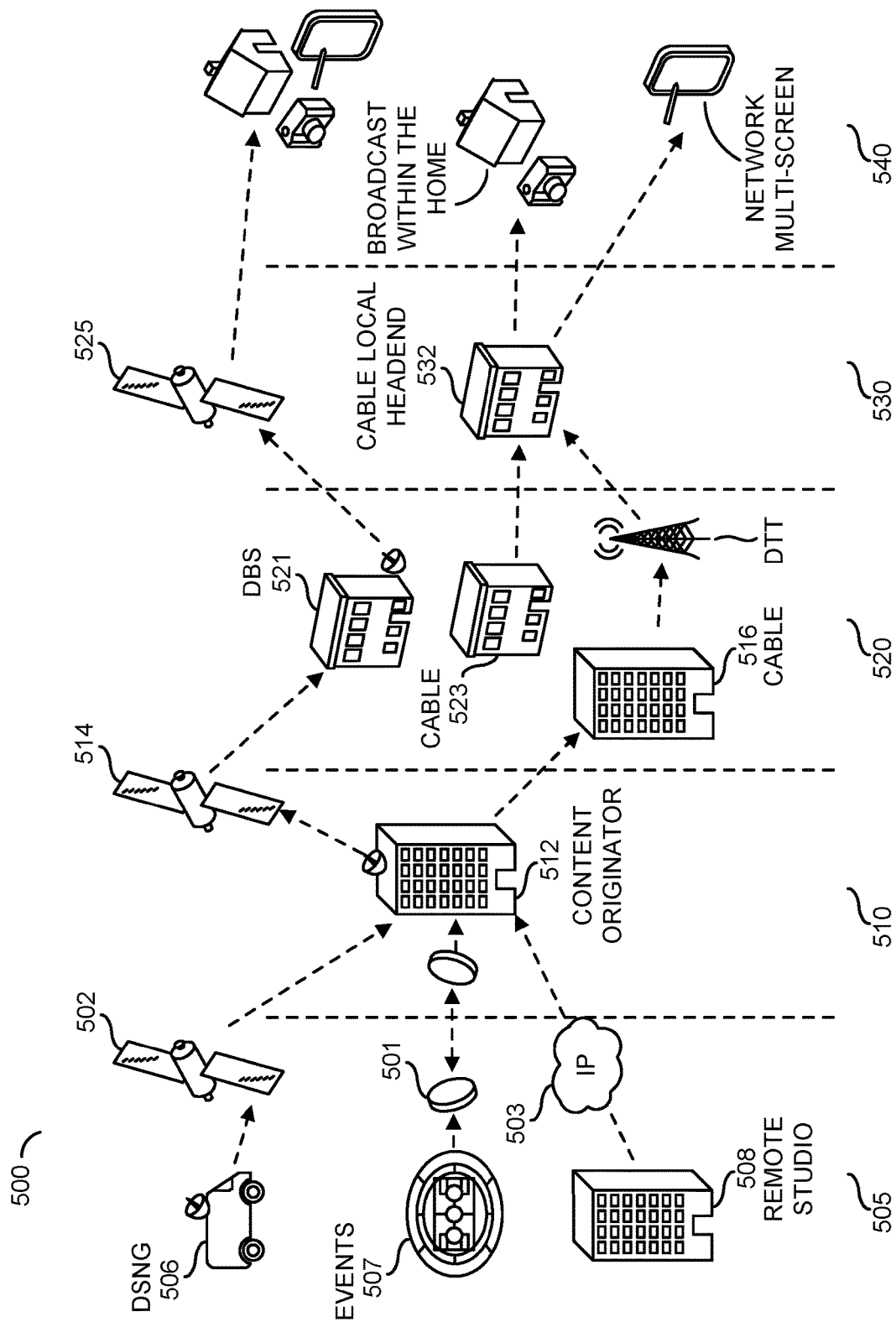
FIG. 5 is a schematic illustration of a video distribution system that may make use of encoders described herein.

FIG. 5 is a schematic illustration of a video distribution system that 500 may make use of encoders described herein. The video distribution system 500 includes video contributors 505. The video contributors 505 may include, but are not limited to, digital satellite news gathering systems 506, event broadcasts 507, and remote studios 508. Each or any of these video contributors 505 may utilize an encoder described herein, such as the noise filter system and encoder 410 of FIG. 4, to encode media source data and provide encoded data to a communications link. The digital satellite news gathering system 506 may provide encoded data to a satellite 502. The event broadcast 507 may provide encoded data to an antenna 501. The remote studio 508 may provide encoded data over a network 503.

A production segment 510 may include a content originator 512. The content originator 512 may receive encoded data from any or combinations of the video contributors 505. The content originator 512 may make the received content available, and may edit, combine, and/or manipulate any of the received content to make the content available. The content originator 512 may utilize encoders described herein, such as the noise filter system and encoder 410 of FIG. 4, to provide encoded data to the satellite 514 (or another communications link). The content originator 512 may provide encoded data to a digital terrestrial television system 516 over a network or other communication link. In some examples, the content originator 512 may utilize a decoder to decode the content received from the contributor(s) 505. The content originator 512 may then re-encode data and provide the encoded data to the satellite 514. In other examples, the content originator 512 may not decode the received data, and may utilize a transcoder to change an encoding format of the received data.

A primary distribution segment 520 may include a digital broadcast system 521, the digital terrestrial television system 516, and/or a cable system 523. The digital broadcasting system 521 may include a receiver, such as the receiver 422 described with reference to FIG. 4, to receive encoded data from the satellite 514. The digital terrestrial television system 516 may include a receiver, such as the receiver 422 described with reference to FIG. 4, to receive encoded data from the content originator 512. The cable system 523 may host its own content which may or may not have been received from the production segment 510 and/or the contributor segment 505. For example, the cable system 523 may provide its own media source data 402 as that which was described with reference to FIG. 4.

The digital broadcast system 521 may include an encoder, such as the noise filter system and encoder 410 of FIG. 4, to provide encoded data to the satellite 525. The cable system 523 may include an encoder, such as the noise filter system and encoder 410 of FIG. 4, to provide encoded data over a network or other communications link to a cable local headend 532. A secondary distribution segment 530 may include, for example, the satellite 525 and/or the cable local headend 532.

The cable local headend 532 may include an encoder, such as the noise filter system and encoder 410 of FIG. 4, to provide encoded data to clients in a client segment 740 over a network or other communications link. The satellite 525 may broadcast signals to clients in the client segment 540. The client segment 540 may include any number of devices that may include receivers, such as the receiver 422 and associated decoder described with reference to FIG. 4, for decoding content, and ultimately, making content available to users. The client segment 540 may include devices such as set-top boxes, tablets, computers, servers, laptops, desktops, cell phones, etc.

Accordingly, encoding, transcoding, and/or decoding may be utilized at any of a number of points in a video distribution system. Embodiments of the present disclosure may find use within any, or in some examples all, of these segments.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

The invention claimed is:

1. An apparatus comprising:
    a filter circuit configured to (i) calculate a noise level of a frame of a video signal based on a subset less than all of a plurality of blocks of the frame, wherein each of the blocks in the subset has an associated weighted activity to variance ratio that exceeds a threshold value, (ii) generate a filtered video signal based on the noise level, wherein an estimated noise level of each of the blocks in the subset is selected from one of (a) an activity of the block, (b) another activity of a reference block of another frame and (c) a sum of absolute pixel differences between the block and the reference block, and (iii) the filter circuit is further configured to determine a saturated pixel intensity range based on a plurality of pixel intensities of the frame, wherein (a) a lower intensity threshold of the saturated pixel intensity range is set where less than a defined percentage of the pixel intensities fall below a minimum value and (b) an upper intensity threshold of the saturated pixel intensity range is set where less than the defined percentage of the pixel intensities exceed a maximum value; and
    an encoder configured to generate a bitstream by encoding the filtered video signal.

2. The apparatus according to claim 1, wherein (i) the filter circuit is further configured to determine a block activity of each of the blocks in the subset and (ii) the block activity is based on a sum of absolute pixel intensity differences within the blocks.

3. The apparatus according to claim 1, wherein (i) the associated weighted activity to variance ratio is determined based on (a) an individual activity value and (b) an individual variance value, (ii) the individual activity value of each of the blocks is based on absolute differences between neighboring pixels of the blocks and (iii) the individual variance value of each of the blocks is based on (a) a sum of absolute differences in pixel intensity and (b) an average pixel intensity of the blocks.

4. The apparatus according to claim 1, wherein (i) the filter circuit is further configured to mark individual blocks of the frame as saturated responsive to a determination that the individual blocks have a (a) minimum pixel intensity, (b) maximum pixel intensity or (c) average pixel intensity that is outside a saturated pixel intensity range and (ii) the individual blocks marked as saturated are excluded from the calculation of the noise level.

5. The apparatus according to claim 1, wherein the defined percentage is ten percent.

6. The apparatus according to claim 1, wherein the reference block is one of (i) a collocated block of the other frame or (ii) a motion-compensated block of the other frame.

7. The apparatus according to claim 1, wherein the activity of the block is based on a sum of absolute pixel differences of the block.

8. A method for filtering noise from a video signal, comprising the steps of:
    determining an individual activity value of each of a plurality of blocks of a frame of the video signal;
    determining an individual variance value of each of the blocks;
    determining a weighted activity to variance ratio of each of the blocks based on (i) the individual activity value and (ii) the individual variance value;
    determining a noise level of the frame based on estimated noise levels of the blocks having a weighted activity to variance ratio above a first threshold value;
    eliminating from the determination of the noise level of the frame each of the blocks having a collocated block in a next frame that has the weighted activity to variance ratio in excess of a second threshold value; and
    filtering the frame based on the noise level using a circuit.

9. The method according to claim 8, further comprising the steps of:
    determining a sum of pixel differences of each of the blocks between the block and a reference block of another frame; and
    eliminating from the determination of the noise level of the frame the blocks having the sum of pixel differences between the blocks and the reference frame that exceeds a maximum threshold value.

10. The method according to claim 8 further comprising the step of:
    eliminating from the determination of the noise level of the frame each of the blocks having an estimated noise level that is less than a next frame noise threshold.

11. The method according to claim 8, wherein the second threshold value is less than the first threshold value.

12. A method for filtering noise from a video signal, comprising the steps of:
- calculating a noise level of a frame of the video signal based on a subset less than all of a plurality of blocks of the frame, wherein the blocks that are saturated are identified based on a plurality of pixels values in the blocks, the blocks that are identified as saturated are eliminated from the calculation of the noise level of the frame, and each of the blocks in the subset has an associated weighted activity to variance ratio that exceeds a threshold value;
- generating a filtered video signal based on the noise level, wherein an estimated noise level of each of the blocks in the subset is selected from one of (a) an activity of the block, (b) another activity of a reference block of another frame, and (c) a sum of absolute pixel differences between the block and the reference block; and
- encoding the filtered video signal using a circuit to provide a bitstream.

13. The method according to claim 12, wherein the identification of the blocks as saturated is further based on the pixel values falling outside a defined range of pixel values.

14. The method according to claim 13, wherein the pixel values of the block are identified as at least one of a minimum pixel value, a maximum pixel value, or an average pixel value.

15. The method according to claim 12, wherein the noise level is calculated by (i) generating a histogram of the estimated noise levels of the blocks in the subset, (ii) filtering the histogram using a low pass filter and (iii) selecting the noise level based on a peak value of the histogram.

16. The method according to claim 15, wherein the noise level is further calculated by (i) determining whether a count of the blocks in the subset having the estimated noise level of the peak value of the histogram exceeds a threshold count and (ii) reducing the noise level responsive to the count being less than the threshold count.

* * * * *